(12) United States Patent
Chui et al.

(10) Patent No.: US 9,246,379 B1
(45) Date of Patent: Jan. 26, 2016

(54) CURRENT LIMIT PROTECTION CIRCUITS FOR USE WITH DEPLETION MOSFET

(71) Applicant: Marvell International Ltd., Hamilton (BM)

(72) Inventors: Siew Yong Chui, Singapore (SG); Tong Wei Lian, Singapore (SG)

(73) Assignee: Marvell International Ltd., Hamilton (BM)

( * ) Notice: Subject to any disclaimer, the term of this patent is extended or adjusted under 35 U.S.C. 154(b) by 36 days.

(21) Appl. No.: 14/053,165

(22) Filed: Oct. 14, 2013

Related U.S. Application Data

(60) Provisional application No. 61/717,858, filed on Oct. 24, 2012.

(51) Int. Cl.
| | | |
|---|---|---|
| *H02M 7/36* | (2006.01) | |
| *H02M 7/62* | (2006.01) | |
| *H02M 7/517* | (2006.01) | |
| *H02M 1/36* | (2007.01) | |
| *H02M 7/06* | (2006.01) | |

(52) U.S. Cl.
CPC ............... *H02M 1/36* (2013.01); *H02M 7/062* (2013.01); *H02M 7/517* (2013.01)

(58) Field of Classification Search
CPC ........ H02M 7/36; H02M 7/062; H02M 7/517
USPC ........ 323/284, 901, 908, 238; 363/49, 52, 53; 361/91.7, 93.9
See application file for complete search history.

(56) References Cited

U.S. PATENT DOCUMENTS

| | | | | |
|---|---|---|---|---|
| 5,966,005 | A * | 10/1999 | Fujimori | 323/315 |
| 7,355,368 | B2 * | 4/2008 | Salato et al. | 323/222 |
| 2007/0058398 | A1 * | 3/2007 | Yang et al. | 363/16 |

* cited by examiner

*Primary Examiner* — Timothy J Dole
*Assistant Examiner* — Ishrat Jamali

(57) ABSTRACT

Aspects of the disclosure provide a circuit that can include a depletion mode transistor coupled to a power source and a current path coupled with the depletion mode transistor in series to provide a current to charge a capacitor. Further, a gate terminal of the depletion mode transistor is coupled to a clamping path that includes a diode and a switch that connected in series. The clamping path clamps the voltage at the gate terminal of the depletion mode transistor to the capacitor. The clamping and the current paths respectively have a first resistance during a first stage, such as when the circuit initially receives power, and have a second resistance during a second stage when the capacitor is charged to have a predetermined voltage level.

20 Claims, 4 Drawing Sheets

CURRENT LIMIT PROTECTION CIRCUITS FOR USE WITH DEPLETION MOSFET

INCORPORATION BY REFERENCE

This present disclosure claims the benefit of U.S. Provisional Application No. 61/717,858, filed on Oct. 24, 2012, the disclosure of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Some electrical and electronic devices, such as AC to DC power converters and the like, require a start-up circuit to first power up and then provide an output voltage to the rest of the devices. During operation of such a device, a magnitude of an output current generated determines the load that can be supported by the device.

SUMMARY

Aspects of the present disclosure provide a circuit that can include a depletion mode transistor coupled to a power supply and a voltage clamp component coupled to a gate terminal of the depletion mode transistor. The voltage clamp component is configured to restrict the gate voltage of the depletion mode transistor to a capacitor voltage during a first stage. Additionally, the voltage clamp component can restrict the gate voltage to a source terminal voltage of the depletion mode transistor during a second stage when the capacitor is charged to have a predetermined voltage level.

According to another embodiment is provided a method. The method includes charging a capacitor through a depletion mode transistor and a current path having a first resistance in a first stage, such as an initial power receiving stage. Further, a gate terminal of the depletion mode transistor is clamped via a first diode and a switch to the capacitor. A control circuit is then powered up with the capacitor voltage and then controls the switch to be OFF in a second stage, wherein the gate terminal voltage of the depletion mode transistor is restricted to a source terminal voltage of the depletion mode transistor.

Another embodiment provides an electronic system. The electronic system can include a rectifier configured to receive and rectify a power supply from an AC power source. The system also includes a circuit including a depletion mode transistor coupled to a power supply and a voltage clamp component coupled to a gate terminal of the depletion mode transistor. The voltage clamp component is configured to restrict the gate voltage of the depletion mode transistor to a capacitor voltage during a first stage, and restrict the gate voltage to a source terminal voltage of the depletion mode transistor during a second stage when the capacitor is charged to have a predetermined voltage level.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
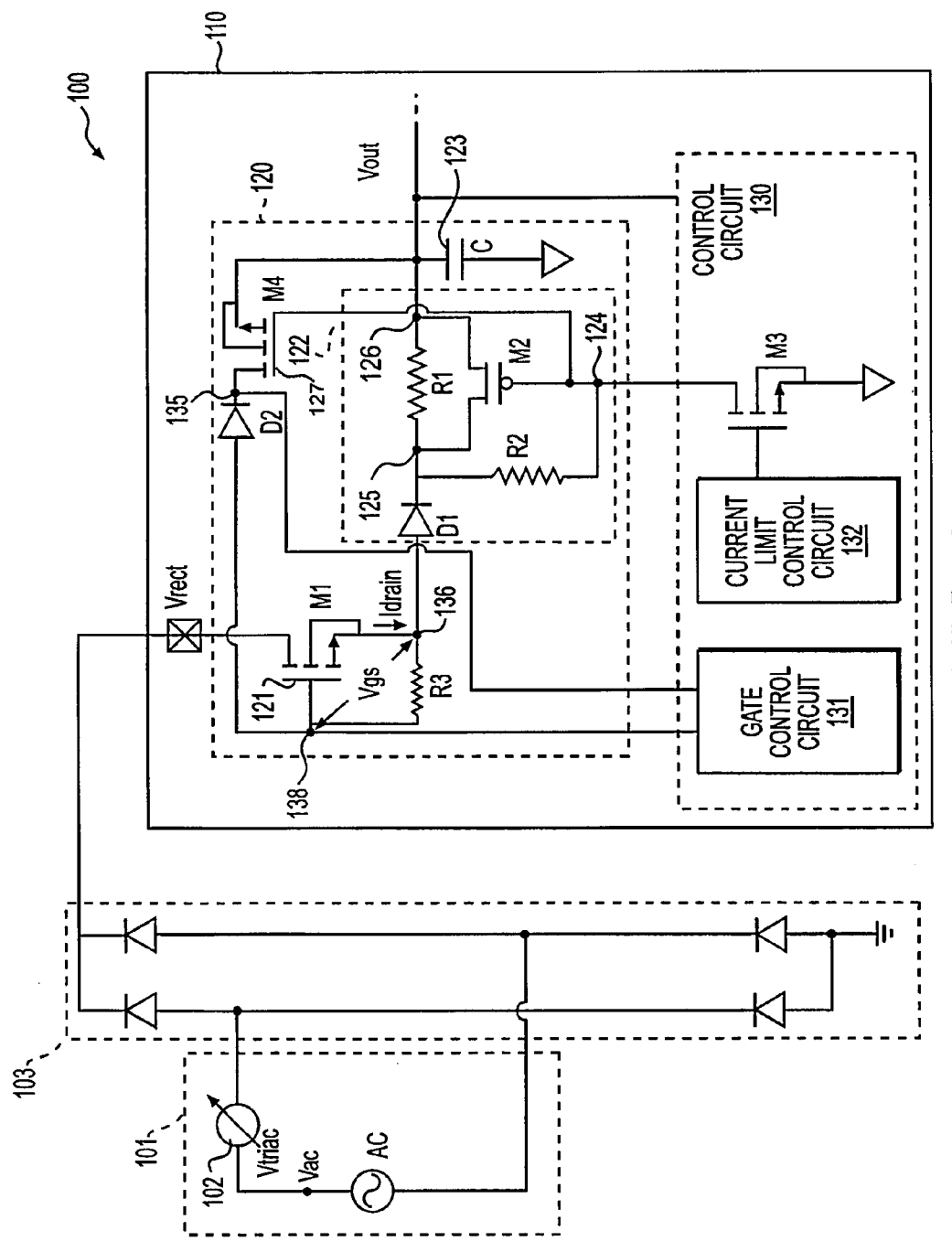
FIG. 1 shows an electronic system 100 that includes a current limit protection circuit.

FIG. 1 shows an electronic system 100 coupled to an energy source 101 according to an embodiment. The electronic system 100 includes a rectifier 103 and a circuit 110 coupled together as shown in FIG. 1.

The energy source 101 provides electric energy to the electronic system 100. In FIG. 1, the energy source 101 is an alternating current (AC) voltage supply that provides an AC voltage, such as 110V AC supply, 220V AC supply, or the like. In addition, the energy source 101 includes suitable elements to adjust the provided electric energy. Specifically, the energy source 101 includes a dimmer 102 to suitably adjust the amount of electric energy provided to the electronic system 100. For instance, the dimmer 102, may be a forward-type triode for alternating current (TRIAC) dimmer having an adjustable dimming angle, wherein the TRIAC voltage $V_{TRIAC}$ is determined based on a phase of the AC voltage $V_{AC}$.

The electronic system 100 is suitably coupled with the energy source 101. For example, the electronic system 100 includes a power cord (not shown) that can be manually plugged into a wall outlet on a power grid. Alternatively, the electronic system 100 may be coupled to a power grid via a switch. When the switch is switched on, the electronic system 100 is coupled to the energy source 101, and when the switch is switched off, the electronic system 100 is decoupled from the energy source 101. Further, the electronic system 100 can be coupled to the energy source 101 at any time during an AC cycle, thus a voltage supply to the electronic system 100 may have a step voltage change. The step voltage change causes an inrush current into the electronic system 100.

The rectifier 103 rectifies the received AC voltage to a fixed polarity, such as to be positive. For example, in FIG. 1, the rectifier 103 is a bridge rectifier 103. The bridge rectifier 103 receives the AC voltage, generates a rectified voltage $V_{RECT}$, and provides the rectified voltage $V_{RECT}$ to other components of the electronic system 100, such as the circuit 110 and the like, to provide electric power to the electronic system 100.

According to an embodiment, the circuit 110 includes a start-up circuit 120, and a control circuit 130. The start-up circuit 120 is configured to receive power supply, setup and maintain a voltage $V_{OUT}$, and provide the voltage $V_{OUT}$ to other circuits, such as the control circuit 130, to enable the operations of the other circuits. The control circuit 130 is configured to generate control signals to control, for example, the start-up circuit 120 after the start-up to maintain the voltage $V_{OUT}$.

The circuit 110 has an initial power receiving stage and a normal operation stage. In an example, when a power cord of the electronic system 100 is plugged in the wall outlet, the start-up circuit 120 starts to receive power supply, and the circuit 110 enters the initial power receiving stage. During the initial power receiving stage, the start-up circuit 120 starts to receive power supply and sets up the voltage $V_{OUT}$. In an example, the start-up circuit 120 includes a capacitor 123, and the voltage $V_{OUT}$ is the voltage on the capacitor 123. During the initial power receiving stage, the start-up circuit 120 charges up the capacitor 123. According to an embodiment of the disclosure, the control circuit 130 requires a supply voltage to be larger than a certain threshold. Thus, in an example, before the voltage $V_{OUT}$ on the capacitor 123 is charged up to a certain level, the control circuit 130 is unable to provide suitable control signals to the start-up circuit 120, and the start-up circuit 120 is in a self-control operation mode. Specifically, the start-up circuit 120 operates without control from other circuits.

When the voltage $V_{OUT}$ on the capacitor 123 is charged up to the certain level, the voltage $V_{OUT}$ is large enough to enable the operations of the control circuit 130, and the circuit 110 enters the normal operation stage. During the normal operation stage, the control circuit 130 provides suitable control signals to the start-up circuit 120 to control the start-up circuit 120 to suitably charge the capacitor 123 to maintain the voltage $V_{OUT}$ on the capacitor 123.

In the example depicted in FIG. 1, the start-up circuit 120 includes a depletion mode transistor 121 (M1) coupled in series with a current path 122 to charge the capacitor 123. The current path 122 has different resistivity in the initial power receiving stage and in the normal operation stage. In an example, the current path 122 has a relatively large resistivity in the initial power receiving stage to limit a current passing the depletion mode transistor 121, and has a relatively low resistivity in the normal operation stage to support running at a relatively higher load.

The depletion mode transistor 121 is configured to be conductive when control voltages are not available, such as during the initial power receiving stage, and the like. In the FIG. 1 example, the depletion mode transistor 121 is an N-type depletion mode metal oxide semiconductor-field-effect-transistor (MOSFET) that has a negative threshold voltage, such as negative three-volt and the like. Before the circuit 100 enters the initial power receiving stage or at the time when the circuit 100 enters the initial power receiving stage, the gate-to-source voltage and the gate-to-drain voltage of the N-type depletion mode MOSFET 121 are about zero and are larger than the negative threshold voltage. Thus an N-type conductive channel exists between the source and drain of the N-type depletion mode MOSFET 121. The N-type depletion mode MOSFET 121 allows an inrush current to enter the circuit 100 and charge the capacitor 123 at the time when the circuit 100 enters the initial power receiving stage.

In the FIG. 1 example, the current path 122 includes a diode D1, a first resistor R1, a second resistor R2, and a transistor M2. These elements are coupled together as shown in FIG. 1. The diode D1 is configured to limit a current direction to charge the capacitor 123, and avoid discharging the capacitor 123 when the instantaneous voltage of the rectified voltage $V_{RECT}$ is lower than the capacitor voltage $V_{OUT}$. For example the first resistor R1 forms a resistive path, and the transistor M2 forms a switchable path in parallel with the resistive path. When the circuit 100 is in the initial power receiving stage, the switchable path is an open path, and thus the resistive path (e.g., the first resistor R1) dominates the resistivity of current path 122; and when the circuit 100 is in the normal operation stage, the switchable path is a short path and dominates the resistivity of the current path 122. In an example, the transistor M2 is an enhance mode transistor, such as an enhance mode P-type MOSFET, configured to have a suitable threshold voltage. The gate voltage of the enhance mode P-type MOSFET transistor M2 is collectively controlled by the second resistor R2, and a portion of the control circuit 130, such as a current limit control circuit 132 and a transistor M3.

During the initial power receiving stage, the current limit control circuit 132 is unable to provide suitable control signal to the transistor M3, and the transistor M3 is off and does not conduct current, for example. Thus, there is substantially no current passing through the second resistor R2, and the gate voltage of M2 (voltage at node 124) is about the same as the source voltage (voltage at node 125). The diode D1 limits the current direction in the first resistor R1, and the drain voltage of M2 (voltage at node 126) is lower or about the same as the source voltage (voltage at node 125). Because the gate-source voltage and gate-drain voltage of the enhance mode P-type MOSFET M2 do not satisfy a threshold voltage requirement, thus the enhance mode P-type MOSFET M2 is turned off.

During the normal operation stage, the current limit control circuit 132 generates a gate control signal to turn on/off the transistor M3 to control the current path 122. In an example, when the transistor M3 is turned on to pass a current, the current also passes the second resistor R2, and causes a voltage drop from node 125 to node 124. In an example, the gate control signal to the transistor M3 is suitable configured such that the voltage drop is enough to turn on the transistor M2 to provide a much lower resistance path than the first resistor R1. Thus, less current flows through the first resistor R1, and the power consumption by the first resistor R1 is reduced.

According to an embodiment of the disclosure, the gate voltage of the depletion mode transistor 121 is suitably controlled during the initial power receiving stage and during the normal operation stage. In the FIG. 1 example, during the initial power receiving stage, the gate voltage of the depletion mode transistor 121 is clamped via a diode D2 and a control switch M4 (122) (connected in series), to the capacitor voltage $V_{OUT}$. Thus, the gate voltage is suitably maintained at the capacitor voltage. Note that the control switch in the power receiving stage is turned ON, thereby connecting the gate of M1 to the capacitor 123. The switch M4 (127) can be a N-type depletion MOSFET with a negative threshold voltage. Thus, in the absence of a control voltage from the gate control circuit 131, the switch 122 is in a default ON state. Alternatively, according to another embodiment, the switch 127, can be configured to be an enhancement mode MOSFET, wherein the switch 127 is in the ON state when the current flowing through resistor R1 generates a voltage higher than the threshold voltage of the switch 127.

During the normal operation stage, the gate voltage of the depletion mode transistor 121 is controlled by a gate control circuit 131 in the control circuit 130. The gate control circuit 131 supplies control voltage to the control switch M4, thereby turning the switch in an OFF state, which in turn disconnects the gate terminal of the depletion mode transistor M1, 121, from the capacitor voltage $V_{OUT}$. This provides for a current leakage path of the depletion mode transistor 121, to be disconnected from the capacitor 123. Specifically, the leakage path that exists between the depletion mode transistor 121 (via diode D2 and control switch M4) and the capacitor 123 is eliminated. This further provides for the gate terminal 138 of depletion mode transistor M1 to be charged via resistor R3, to substantially the same potential as the potential on terminal 136. The depletion mode transistor 121 exhibits 0V across the gate and source terminals ($V_{GS}=0$). Since the voltage across the gate-source terminals of M1 is higher than a negative threshold voltage, a higher charging current (drain current) is generated that can be used to support higher loads.

Figure 2:
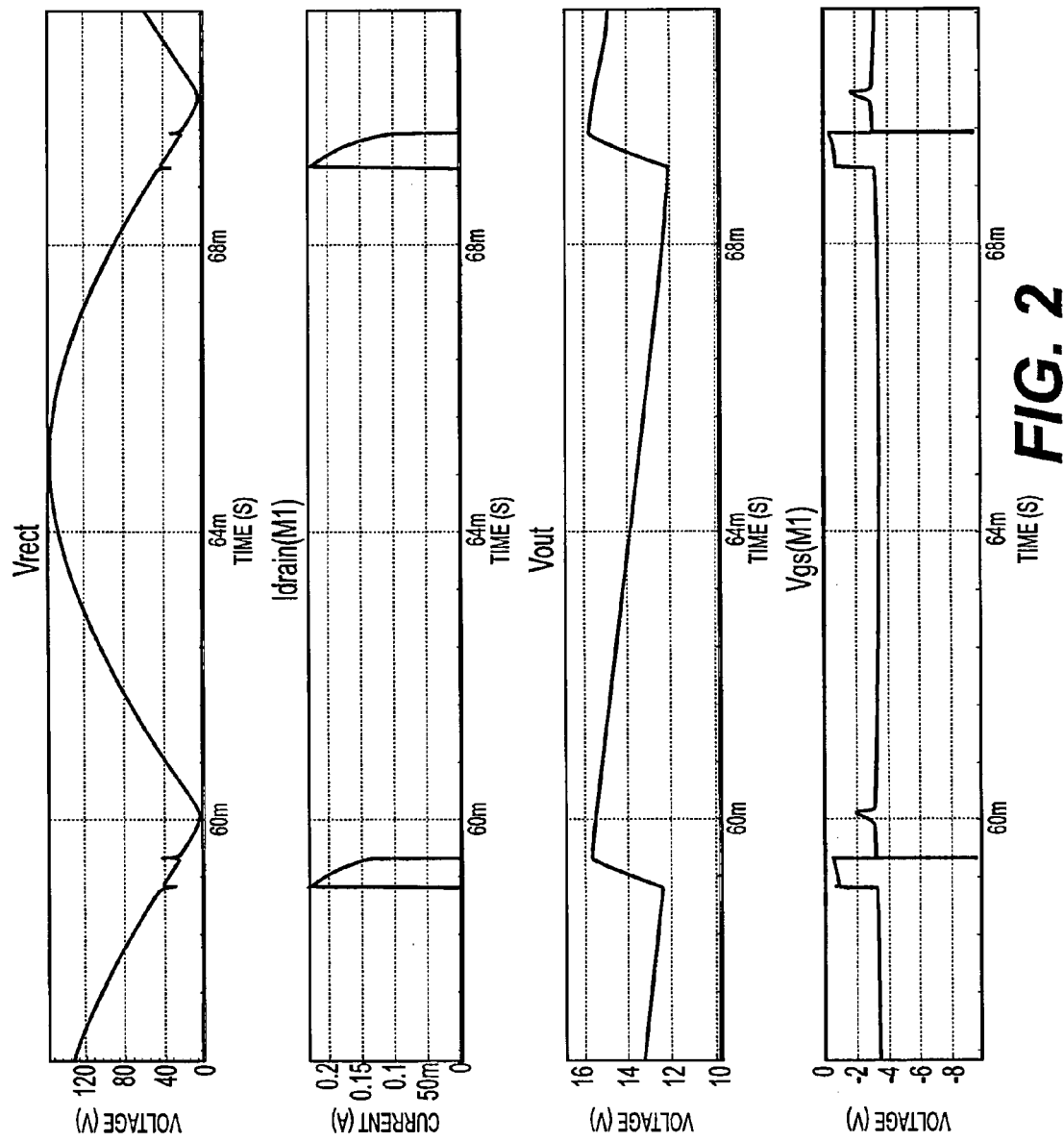
FIG. 2 shows waveforms when the electronic system 100 does not include a control switch.

FIG. 2 depicts waveforms when the electronic system 100 does not include a control switch (M4) in a clamping path of the depletion mode transistor. Specifically, referring to FIG. 1, in this configuration, the gate terminal of the depletion transistor M1 is directly connected to the capacitor 123 via the diode D2. Note that in such a configuration, a current leakage path always exists in the normal operating stage.

As shown in FIG. 2, when the rectifier voltage is high (50V-120V) the inrush current is off, and thereby avoids a large power dissipation at the depletion mode transistor 121.

In the normal operating mode the rectifier voltage is about 40V, and the diode D2 clamps the gate voltage of the depletion mode transistor 121. As the gate voltage is clamped to the output voltage ($V_{OUT}$), the voltage across the gate source terminals of the depletion mode transistor is negative, and thus limits the amount of drain current that can be achieved in order to support higher loads. Specifically, as shown in FIG. 2, the voltage across the gate source terminals of the transistor M1 is approximately −1V, which limits the amount of drain current to reach a maximum of 0.23 Amperes.

Figure 3:
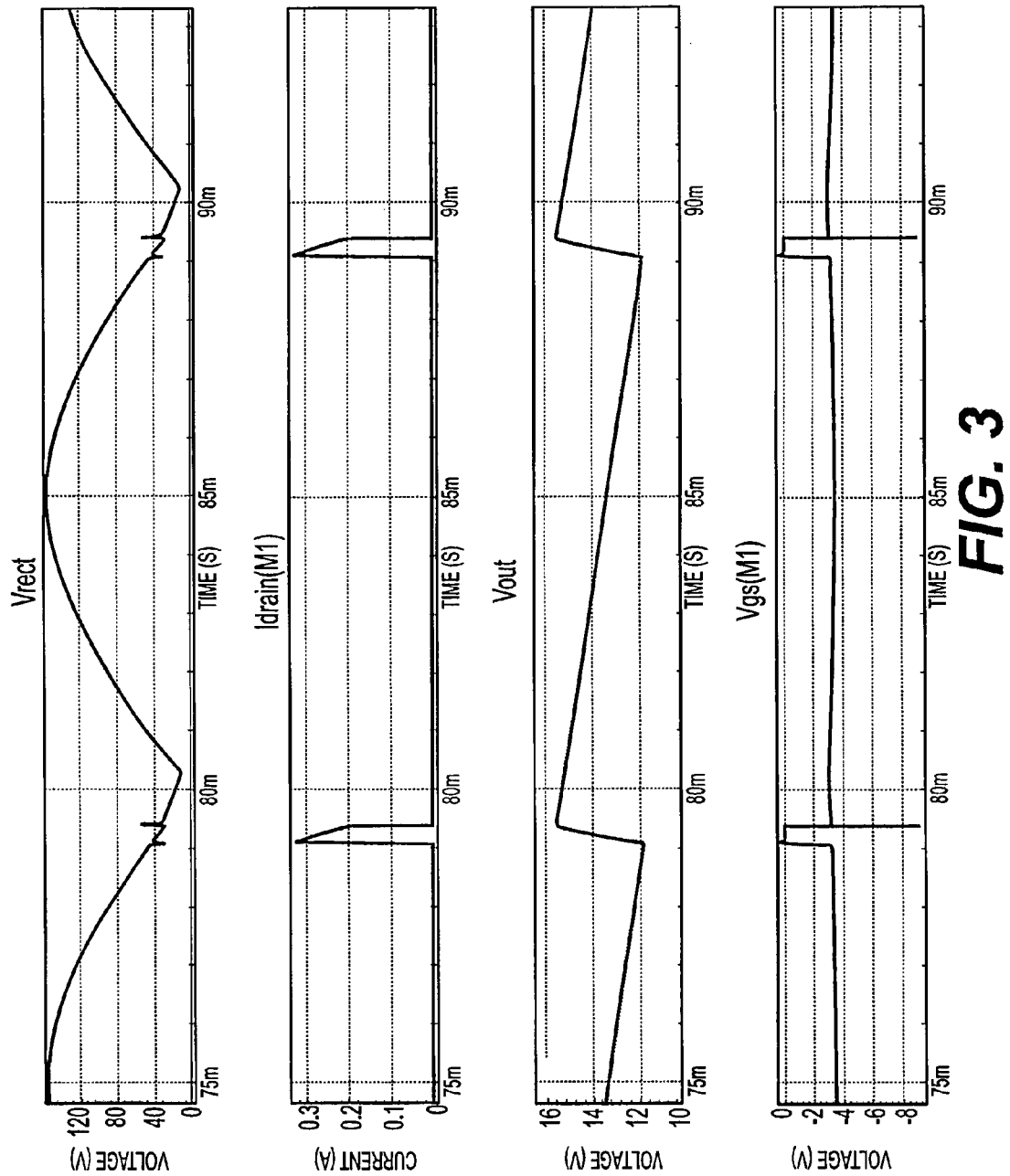
FIG. 3 shows waveforms when the electronic system 100 includes the control switch.

FIG. 3 depicts waveforms when the electronic system 100 includes a control switch (M4) in a clamping path of the depletion mode transistor. In this configuration, in the power receiving stage, the control switch is ON, thereby maintaining the gate voltage of the depletion mode transistor M1 to the voltage of the capacitor ($V_{OUT}$). However, in the normal operating stage, the switch is configured to be turned OFF by the application of control voltage by the gate control circuit 131. Thus, the gate terminal of the depletion mode transistor M1 is disconnected from the capacitor 123.

Because there is no leakage path through diode D2, the gate terminal of the depletion mode transistor M1 charges (through resistor R3), to the same potential as the source terminal of the depletion mode transistor M1. Thus, as shown in FIG. 3, the voltage drop across the gate and source terminals ($V_{GS}$) of the depletion mode transistor M1 is zero. This provides for a higher peak drain current to be generated. Specifically, by configuring the control switch M4 to be turned OFF in the normal operation mode, the peak current generated is 0.330 Amperes. Thus, by eliminating the leakage path, a 43% increase in current is obtained which can support higher loads.

Figure 4:
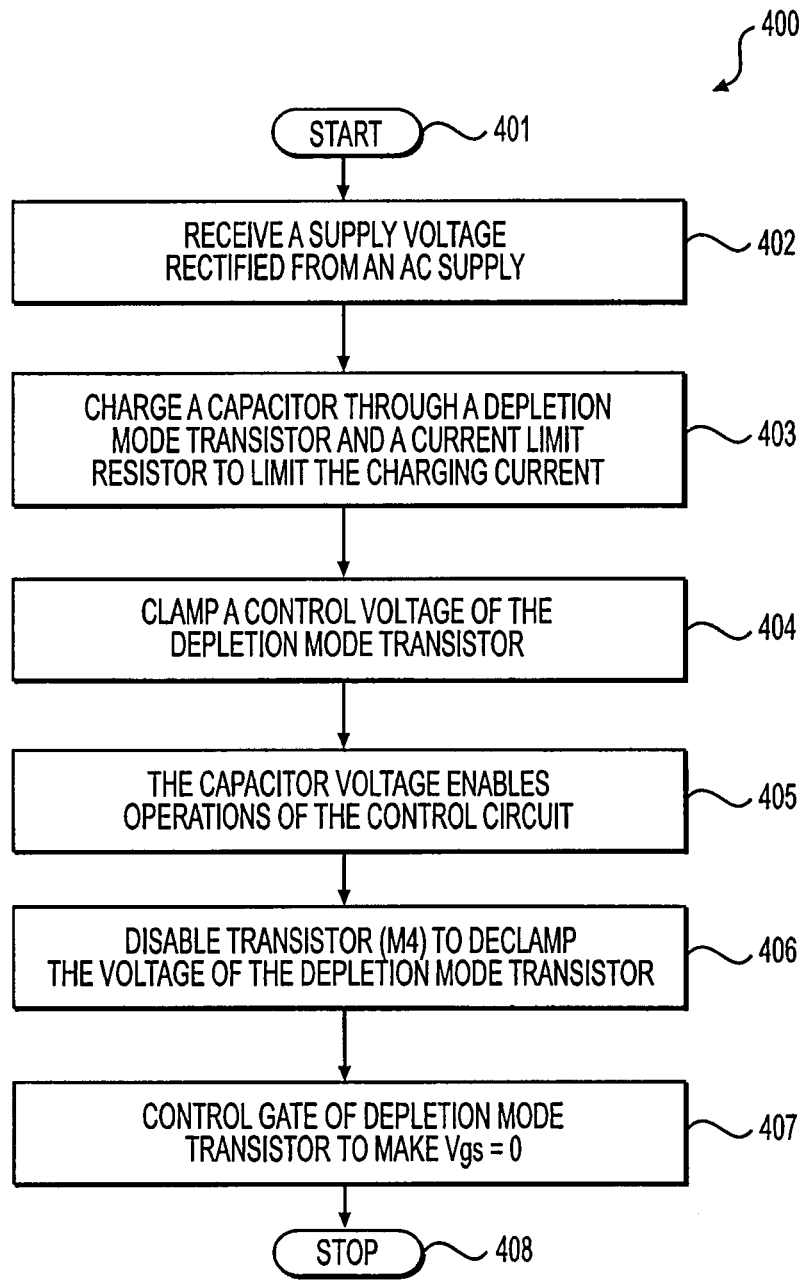
FIG. 4 depicts a flowchart outlining a process 400 according to an embodiment of the disclosure.

FIG. 4 shows a flowchart outlining a process 400 to start up the circuit 100 according to an embodiment of the disclosure. The process starts at S401, and proceeds to S402.

At S402, the circuit 100 receives a supply voltage rectified from an AC power supply and the circuit 100 enters the initial power receiving stage. In an example, when a power cord of the electronic system 100 is plugged in the wall outlet or when a switch is switched on that couples the electronic system 100 with the energy source 101, the voltage $V_{RECT}$ becomes non-zero, and provides power to the circuit 100. The start-up circuit 120 starts operation.

At S403, the start-up circuit 120 charges the capacitor 123 through the depletion mode transistor 121 and the first resistor R1 that limits the charging current during the initial power receiving stage. The capacitor voltage $V_{OUT}$ is provided to other circuits, such as the control circuit 130, and the like, of the circuit 100. Because the output voltage $V_{OUT}$ is lower than a certain level, the control circuit 130 is unable to provide suitable control signals to the start-up circuit 120 during the initial power receiving stage. Thus, the transistor M2 is turned off and the first resistor R1 dominates the resistivity of the current path 122 and limits the inrush current.

At S404, the gate voltage of the depletion mode transistor M1 is clamped by the second diode D2 and a switch (M4) to the capacitor voltage, to avoid being too high during the initial power receiving stage. Further, the gate source voltage $V_{GS}$ of the depletion mode transistor M1 is stabled to limit the drain current $I_{DRAIN}$. The start-up circuit 120 limits and stabilizes the inrush current for charging the capacitor 123, and protects the depletion mode transistor 121 from high power dissipation induced failure.

At S405, when the output voltage $V_{OUT}$, which is the capacitor voltage, is high enough, the output voltage $V_{OUT}$ enables operations of the control circuit 130. Then, the control circuit 130 provides control signals to the start-up circuit 120, and the circuit 110 enters the normal operation stage.

At S406, the gate control circuit deactivates the switch (M4) via a control signal, thereby disconnecting the gate terminal of the depletion mode transistor (M1) from the capacitor. Thus, a current leakage path via diode D2 is eliminated. In turn, the gate terminal of the depletion mode transistor M1 charges through resistor R3 such that the potential difference between the gate terminal and the source terminal of the depletion mode transistor is zero (S407). This causes a larger charging current to be generated by the depletion mode transistor, which can be used to support higher loads. Further, note that in the normal operation mode, the current limit control circuit 132 provides a suitable control signal to turn on the transistor M3, and thus turn on the transistor M2 to reduce current flowing through the first resistor R1. Then, the process proceeds to S408 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit comprising:
    a depletion mode transistor coupled to a power supply; and
    a voltage clamp component including a diode and a switch coupled in series, between gate terminal of the depletion mode transistor and a capacitor, the voltage clamp component configured to restrict a gate voltage of the depletion mode transistor to the capacitor voltage during a first stage, and restrict the gate voltage to a source terminal voltage of the depletion mode transistor during a second stage when the capacitor is charged to a predetermined voltage level.

2. The circuit of claim 1, wherein the switch is controlled to be ON in the first stage and controlled to be OFF in the second stage.

3. The circuit of claim 1, wherein the capacitor voltage powers up a control circuit to control a gate voltage of the depletion mode transistor and a switch.

4. The circuit of claim 1, further comprising:
    a current path coupled with the depletion mode transistor in series to provide a current charge to the capacitor, the current path having a first resistance during the first stage, and a second resistance during the second stage.

5. The circuit of claim 4, wherein the current path further comprises:
    a resistive path configured to have the first resistance; and
    a switchable path coupled in parallel with the resistive path, the switchable path being in an open state during the first stage, and being in a close state during the second stage.

6. The circuit of claim 4, wherein the current path further comprises:
    a second diode configured to limit a current direction to charge the capacitor.

7. The circuit of claim 1, wherein the depletion mode transistor is an N-type metal-oxide-semiconductor-field-effect-transistor having a negative threshold value.

8. The circuit of claim 1, wherein the circuit is in the first stage when the circuit initially receives power.

9. A method comprising:
    charging a capacitor through a depletion mode transistor and a current path having a first resistance in a first stage;
    clamping a gate terminal of the depletion mode transistor via a first diode and a switch that are coupled in series between the gate terminal of the depletion mode transistor and the capacitor;
    powering up a control circuit with a voltage of the capacitor and then controlling the switch to be OFF in a second stage, wherein the gate terminal voltage of the depletion mode transistor is restricted to a source terminal voltage of the depletion mode transistor.

10. The method of claim 9, wherein the powering step further comprises:
    turning on a transistor in the current path when the capacitor voltage is at the predetermined level.

11. The method of claim 10, further comprising:
    limiting a current direction to charge the capacitor with a second diode in the first stage.

12. The method of claim 9, further comprising:
    powering up the control circuit to control the gate terminal of the depletion mode transistor and the switch in the second stage.

13. The method of claim 9, wherein charging the capacitor through the depletion mode transistor and the current path having the first resistance in the first stage further comprises:
    charging the capacitor through the depletion mode transistor and the current path having the first resistance during an initial power receiving stage.

14. An electronic system comprising:
    a rectifier configured to receive and rectify a power supply from an AC power source; and
    a circuit comprising:
        a depletion mode transistor coupled to a power supply; and
        a voltage clamp component including a diode and a switch coupled in series between a gate terminal of the depletion mode transistor and a capacitor, the voltage clamp component configured to restrict the gate voltage of the depletion mode transistor to a capacitor voltage during a first stage, and restrict the gate voltage to a source terminal voltage of the depletion mode transistor during a second stage when the capacitor is charged to have a predetermined voltage level.

15. The electronic system of claim 14, wherein the switch is controlled to be ON in the first stage and controlled to be OFF in the second stage.

16. The electronic system of claim 14, further comprising:
    a current path coupled with the depletion mode transistor in series to provide a current charge to the capacitor, the current path having a first resistance during the first stage, and a second resistance during the second stage.

17. The electronic system of claim 16, wherein the current path further comprises:
    a resistive path configured to have the first resistance;
    a switchable path coupled in parallel with the resistive path, the switchable path being in an open state during the first stage, and being in a close state during the second stage; and
    a second diode configured to limit a current direction to charge the capacitor.

18. The electronic system of claim 14, wherein the circuit further comprises:
    a control circuit that is configured to
        power up when the capacitor is charged to have the predetermined capacitor voltage, and
        control a gate voltage of the depletion mode transistor and a switch.

19. The electronic system of claim 18, wherein the control circuit is coupled to the capacitor directly or is coupled to the capacitor indirectly during power up.

20. The electronic system of claim 14, wherein the circuit further comprises:
    a second diode configured to limit a current direction to charge the capacitor.

* * * * *